United States Patent [19]

Nilson

[11] Patent Number: 5,436,953
[45] Date of Patent: Jul. 25, 1995

[54] DIGITAL LONGITUDINAL BALANCE MEASUREMENT

[75] Inventor: Stephen K. Nilson, Wake Forest, N.C.

[73] Assignee: Northern Telecom Limited, Montreal, Canada

[21] Appl. No.: 84,943

[22] Filed: Jul. 2, 1993

[51] Int. Cl.$^6$ ............... H04M 1/24; H04M 3/08; H04M 3/22
[52] U.S. Cl. ........................ 379/27; 379/2; 379/22; 379/24; 379/26; 379/30
[58] Field of Search ............... 379/2, 6, 22, 24, 26, 379/27, 30

[56] References Cited

U.S. PATENT DOCUMENTS

| | | | |
|---|---|---|---|
| 4,438,298 | 3/1984 | Rubin | 179/175.2 R |
| 4,446,341 | 5/1984 | Rubin | 179/175.2 R |
| 4,459,436 | 7/1984 | Rubin | 179/175.2 R |
| 4,467,147 | 8/1984 | Rubin | 179/175.2 C |
| 4,756,017 | 7/1988 | Bush | 379/22 |
| 4,777,645 | 10/1988 | Faith | 379/22 |
| 4,794,632 | 12/1988 | Burton | 379/22 |
| 4,860,332 | 8/1989 | Chism | 379/27 |
| 4,870,675 | 9/1989 | Fuller | 379/6 |
| 5,063,351 | 11/1991 | Goldthorp | 379/24 |
| 5,073,919 | 12/1991 | Hagensick | 379/30 |
| 5,073,920 | 12/1991 | Masukawa et al. | 379/30 |
| 5,113,426 | 5/1992 | Kinoshita | 379/26 |
| 5,202,882 | 4/1993 | Rudolf | 379/27 |
| 5,218,616 | 6/1993 | Stephens | 379/27 |
| 5,228,072 | 7/1993 | Ingalsbe | 379/6 |

OTHER PUBLICATIONS

*ANSI/IEEE Std 455—1995*, "IEEE Standard Test Procedure for Measuring Longitudinal Balance of Telephone Equipment Operating in the Voice Band", 1985.

Primary Examiner—Stephen Chin
Assistant Examiner—Vijay Shankar
Attorney, Agent, or Firm—Foley & Lardner

[57] ABSTRACT

For obtaining a longitudinal balance of a pair of relatively long wires, a sinusoidal stimulus signal is generated by processing digital reference signals and is applied to the pair in at least two different connection profiles. Voltages at each wire are measured in each connection profile and are combined with the digital reference signals to derive drive representative values and metallic representative values of the pair of the long wire. The longitudinal balance is calculated from these representative values. The invention requires no highly balanced circuit to provide highly accurate measurements. The measurement inaccuracies and inherent unbalance of the measuring circuitry are eliminated by the use of at least two connection profiles and signal processing.

15 Claims, 2 Drawing Sheets

DIGITAL LONGITUDINAL BALANCE MEASUREMENT

FIELD OF THE INVENTION

The present invention relates generally to techniques of digitally measuring the longitudinal impedance balance of a network having a pair of relatively long wires. In particular, it is directed to an apparatus for and method of digitally measuring the longitudinal balance of a telephone subscriber's loop or an interoffice trunk.

BACKGROUND OF THE INVENTION

Most signalling on telephone subscriber loops is performed between tip and ring, known as metallic signalling. The tip and ring have capacitance to the cable sheath and other tip-ring pairs. Occasionally, a loop may develop resistive faults to other pairs or to the sheath. Discussions of capacitance, impedance, or resistances from the tip and/or ring to other pairs and the sheath are often grouped, and referenced as longitudinal characteristics. They are also described as tip-ground and ring-ground components or measurements.

Subscriber loops and also analog inter-office trunks in telecommunications systems often run in near proximity to power lines and other sources of interference, and are susceptible to noise induction. These power lines and other sources induce current flow longitudinally in the pair. This longitudinally induced current flows in both tip and ring, in the same direction at the same time, and may result in several volts between the pair and ground. A percentage of this longitudinal voltage may appear differentially between the wires of the pair, and cause interference in the intended signals travelling on the pair. The amount of differential voltage (also called "metallic voltage" because it is between tip and ring) is determined by the relative impedances to ground of the individual wires in the pair. The relative impedances can be measured, and is called the longitudinal balance of the loop. Longitudinal balance is measured by inducing a specific signal into the loop longitudinally, and measuring the resulting metallic signal. The balance is basically the ratio of the stimulus over the measured signal. Higher values of balance indicate better matching of the tip-ground and ring-ground complex impedances, and infer less metallic noise on the loop. The balance of a loop must always be evaluated with the knowledge of the frequency of the measurement (stimulus frequency). The balance will vary with frequency, as the loop comprises a set of complex impedances which affect the sensitivity of the loop to longitudinal induction.

Balance measurements have traditionally been performed by disconnecting the pair from a telephone switch frame, and using a special purpose balance measurement instrument. As will be explained below, the instruments typically require significant expertise and manual adjustment before they present correct results. They are also difficult, if not impossible, to operate remotely. There are U.S. patents for automatic test sets for analyzing various parameters of a telephone subscriber's loop. For example, U.S. Pat. No. 5,073,919, issued Dec. 17, 1991 (Hagensick); U.S. Pat. No. 5,073,920, issued Dec. 17, 1992 (Masukawa et al); U.S. Pat. No. 4,459,436, issued Jul. 10, 1984 (Rubin); U.S. Pat. No. 4,446,341, issued May 1, 1984 (Rubin); U.S. Pat. No. 4,438,298, issued Mar. 20, 1984 (Rubin); and U.S. Pat. No. 4,467,147, issued Aug. 21, 1984 (Rubin), all teach mechanized testing equipment for measuring characteristics of subscriber's loops from the end at a central switching office. U.S. Pat. No. 4,459,436 above describes longitudinal balance measurement among other characteristics. In the patent, Rubin digitally generates stimulus signals and applies them to a loop under test. However, he uses a magnetic current sensor on the tip and ring. A special offset arrangement of the sensors detects a differential current between the pair and compensation factors are applied for calculation of the balance. The system still requires a great deal of analog operation and lacks accuracy.

The present invention allows a precise measurement of the balance remotely, automatically, relatively quickly, and without human intervention during the measurement. A foreign frequency at the stimulus frequency may cause significant error in the measurements. It is important to select a stimulus frequency which is not harmonically related to power line induction on the loops. The present invention allows selection of the stimulus frequency, so that the most appropriate frequency for the loop or trunk may be used. Typically, 200 Hz would be used on POTS (plain old telephone service) loops in North America, and 193 Hz would be suitable for POTS in other parts of the world which run 50 Hz primary power. Higher frequencies may be of interest for special purpose loops, trunks or services which are particularly susceptible to high frequency induction. The present invention rejects foreign frequencies which are at least 5 Hz away from the stimulus frequency.

OBJECTS OF THE INVENTION

It is therefore an object of the present invention to provide a method of and apparatus for digitally measuring the longitudinal balance of a pair of wires.

It is another object of the present invention to provide a method of and apparatus for digitally measuring the longitudinal balance of a telephone subscriber's loop or inter-office trunk.

It is a further object of the present invention to provide a digital longitudinal balance measurement test set which is easy and quick to operate and can be remotely handled without human intervention.

SUMMARY OF THE INVENTION

Briefly stated, according to one aspect the present invention relates to a method of measuring longitudinal balance of a pair of relatively long wires having tip and ring terminals. The method comprises steps of digitally generating a sinusoidal stimulus signal of a predetermined frequency by processing digital reference signals and applying the sinusoidal stimulus signal to the tip and ring terminals. The method also includes steps of measuring voltages at the tip, ring and the ground terminals with respect to each other and digitizing the measured voltages to generate digital measured signals. The method further includes the step of processing digital measured and reference signals to derive the longitudinal balance of the pair.

According to another aspect, the invention is directed to an apparatus for digitally measuring the longitudinal balance of a pair of relatively long wires having tip and ring terminals. The apparatus comprises a digital reference signal generator having a reference table for generating digital reference signals and a converter for converting the digital reference signals to a sinusoidal stimulus signal of a predetermined frequency to be applied to the tip and ring terminals. The apparatus also includes measuring means for measuring voltages at the tip, ring and ground terminals with respect to each other and a relay matrix having a plurality of switching relays for selectively configuring a desired connection profile among the terminals, converter and measuring means so that the sinusoidal stimulus signal can be applied to any selected one of the terminals and the voltages can be measured at any selected one of the terminals. The apparatus further includes digitizing means for digitizing the measured voltages to generate digital measured signals and digital signal processing means for processing digital measured signals and digital reference signals to derive the longitudinal balance of the pair.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

Over the years a variety of measurement techniques have evolved, all of which report the balance in slightly different terms, which can be confusing and are not easily related to each other. ANSI/IEEE Std 455-1985 (IEEE Standard Test Procedure for Measuring Longitudinal Balance of Telephone Equipment Operating in the Voice Band) is generally accepted as the definition of longitudinal balance, and most equipment manufacturers ascribe to its measurement technique.

Figure 1:
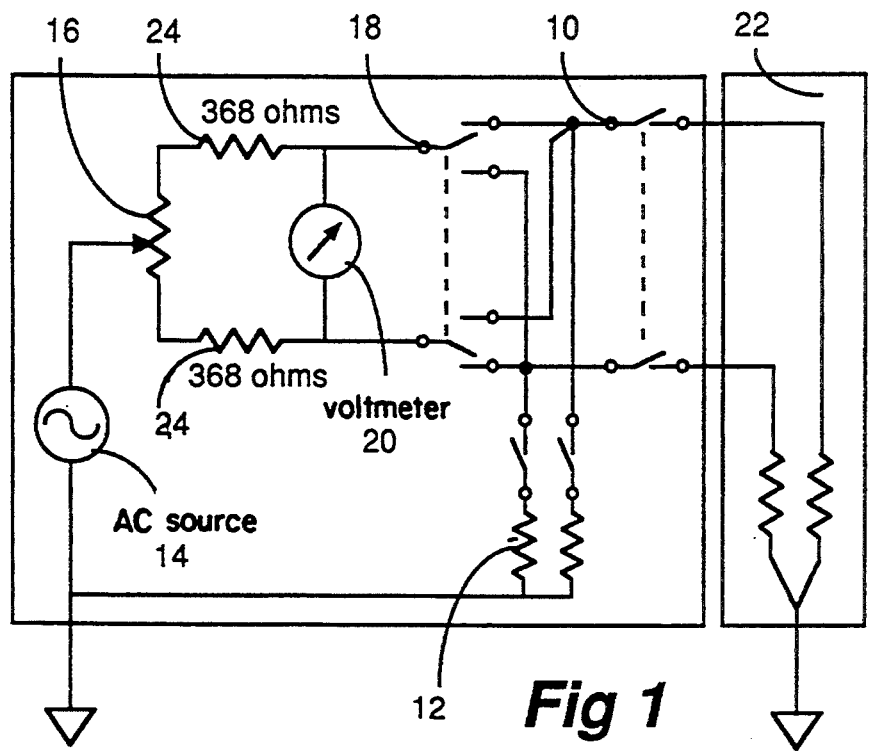
FIG. 1 is a brief circuit diagram of a prior art measurement set.

FIG. 1 illustrates a simplified view of the circuitry involved. First, with a loop contact switch 10 open and calibration switches 12 closed, a longitudinal AC source (stimulus source) 14 drives the circuit and a balance adjust 16 calibrates the internal balance of the circuit between the two positions of a reversal switch 18 with the aid of a selective frequency high impedance voltmeter 20. This ensures that the internal impedances of the tip and ring sides are same. The loop 22 under test is then driven by the same AC source (stimulus source) 14 through the pair of precision matched resistors 24. The stimulus frequency is typically 200 Hz, and the stimulus voltage is nominally 8.5 volts rms. The selective frequency high impedance voltmeter 20 is also used to measure the metallic voltage in two measuring directions selectable by the reversal switch 18. The metallic voltage is a mean value of the two measured voltages. The balance is then computed from this equation:

$$\text{balance} = 20 * \log_{10}(\text{drive volts/metallic volts}). \quad [1]$$

The balance is in units of dB. In practice, the balance is displayed on an analog meter, the scale of which has been pre-calculated per the equation. Reversal switch 18 allows the operator to see if the balance is the same in both tip-ring and ring-tip configurations. The higher the number, the better the balance and the less susceptible the pair is to metallic noise induction due to longitudinal sources and coupling.

This technique places several requirements on the hardware, since it is normal procedure for measuring equipment to have higher internal accuracy and performance parameters than the circuit under test:

1. The source resistors must be very well matched so that the drive circuit is itself better balanced than the pair under test. The nominal resistance is 368 ohms, which is appropriate for subscriber loops. For example, the drive circuit must have a balance at least 19 dB greater than the loop under test to achieve 1 dB of measurement accuracy. If the measurement range is to 80 dB, the two resistors must be s matched to within 0.016 ohms.
2. The selective frequency voltmeter must have similar internal balance performance, and operate with a high bridging impedance so as to minimize disturbance of the loop.

Traditional measuring sets satisfy these requirements by expensive high performance tight tolerance components, manual adjustments to the circuits to tune their balance, or both. The manual adjustment sets require great patience and significant expertise to operate correctly, and are not amenable to remote control applications. Setup typically requires iterative adjustments into calibration loads to null out drive imbalance.

Figure 2:
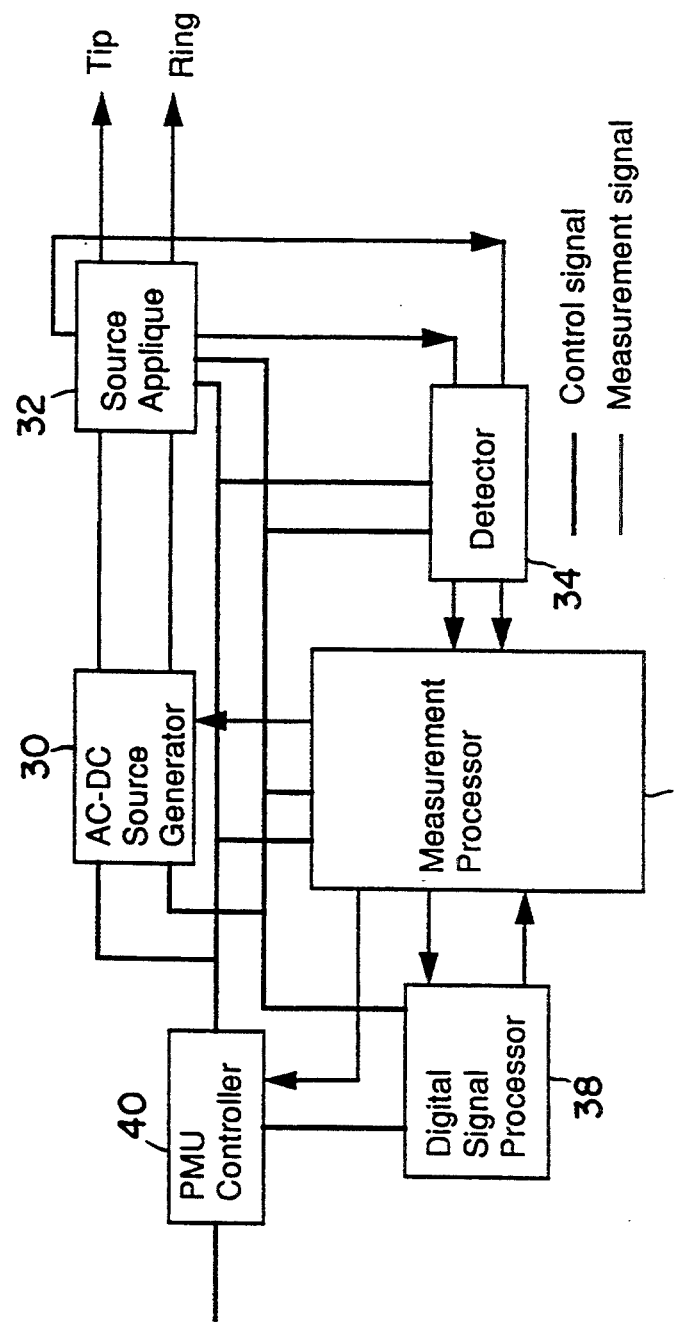
FIG. 2 is a schematic diagram of another prior art measurement technique.

Referring to FIG. 2, there is shown another prior art technique for measuring various characteristics of a subscriber's loop according to the aforementioned U.S. Pat. No. 4,459,436. A stimulus signal of a certain frequency is generated digitally at an AC-DC source generator 30 and is applied through a source applique 32 to the tip and ring terminals. The source applique contains magnetic current sensors to measure the currents flowing through the tip and ring terminals. The measured currents are received at detectors 34 whose outputs are sent to a measurement processor 36 for further processing. A digital signal processor 38 and PMU (Precision Measurement Unit) controller 40 are provided for controlling the operations of the source generator, source applique and measurement processor so that a number of different parameters can be measured, the longitudinal balance being one. The magnetic current sensors sense the magnetically induced currents and for the longitudinal balance measurement, the two sensors are connected in such a fashion that one produces a ring current and the other a differential (metallic) current. The measurement processor calculates the ratio of these currents to generate the longitudinal balance. It should be noted that this patent only measures the drive current and the metallic current in one connection configuration, that is to say, no reverse measurements are conducted. It also requires different calculations for different ranges of measured ring current.

Figure 3:
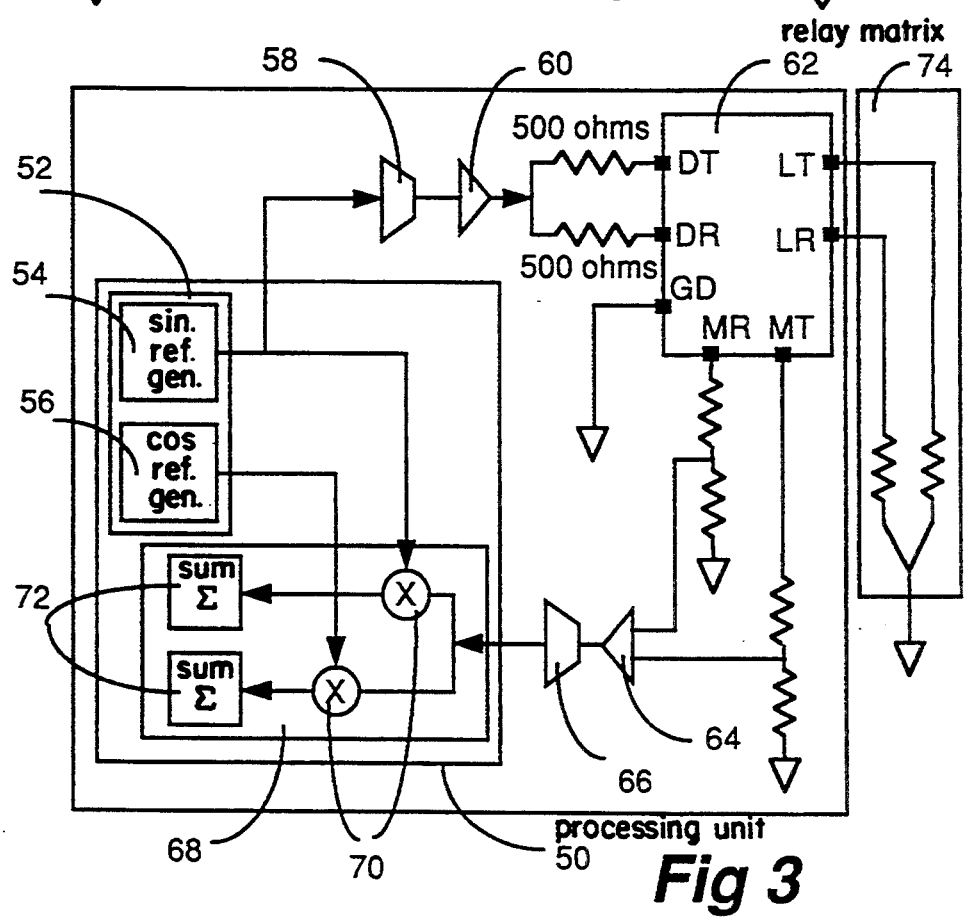
FIG. 3 is a schematic diagram of a measurement technique according to an embodiment of the present invention.

FIG. 3 illustrates schematically a digital longitudinal balance measurement apparatus according to one embodiment of the invention. In the figure, a processing unit 50 contains wave generator 52 which includes sine and cosine reference generators 54 and 56 which generate, respectively, digital sine and digital cosine reference samples from tables. The digital sine samples are also applied to a D/A converter 58 and amplifier 60 to generate an analog stimulus signal of a selected frequency. The source resistors in this embodiment are 500 ohms but other values can be chosen to match different types of loops (analog trunk, ISDN loop etc.) to be tested. A relay matrix 62 is a collection of relay switches to perform desired connection profiles. Stimulus signals are measured at measuring terminals MR and MT through voltage dividers. A differential amplifier 64 derives an analog measured signal which is converted to a digital signal by an A/D converter 66. In a digital voltage measuring unit 68, measured sine samples and measured cosine samples are processed by multipliers 70 and summation circuits 72. The wave generator 52 and voltage measuring unit 68 are contained in the processing unit 50.

The basic premise of the longitudinal balance measurement technique is that an inherently unbalanced measurement unit will get two different balance measurements of the loop, when the loop wires are reversed for the second measurement. The true loop balance is between the two measurements, and can be ascertained.

In one embodiment, longitudinal balance is measured in several drive steps, using the same meter for all measurements:

1) Measure the open circuit longitudinal drive voltage, without any connection to the loop. Relay matrix 62 connects DT to MT, GD to MR. The effect of the 500 ohm resistor can be calculated to obtain the voltage at the junction of the source resistors. This becomes the numerator in the balance calculation.
2) With the loop 74 connected, drive the loop through the source resistors and measure the longitudinal voltages tip to ground and ring to ground. Relay matrix 62 connects DT to LT, DR to LR, DT to MT, GD to MR for tip-gnd measurement. Relay matrix connects DT to LT, DR to LR, DR to MT, GD to MR for ring-gnd measurement. These measurements are used to measure the tip-gnd and ring-gnd impedances for future correction factors.
3) Drive the loop 74 through the source resistors, with the measurement tip and ring connected to the loop tip and ring respectively. Relay matrix connects DT to LT, DR to LR, DT to MT, DR to MR. Measure this "normal connection" metallic voltage.
4) Drive the loop through the source resistors, with the measurement tip and ring connected to the loop ring and tip respectively. Relay matrix connects DT to LR, DR to LT, DT to MT, DR to MR. This reverses the loop as far as the measurement head is concerned. Measure this "reverse connection" metallic voltage.

The present invention uses digital signal processing, minimizing the amount of hardware required for the system. This technique does not require special DSP computers, and may be performed in the analog domain, hardware digital domain, or software.

The wave generator 52 contains a pair of tables (sine table and cosine table) and the sine table is used for generating the drive (stimulus) voltage sine wave. Of course a cosine table can be used with proper modifications. A portion of sine or cosine table can also be used because of the symmetrical nature of sine and cosine waves. These tables also serve as references for the digital voltage measuring unit 68. The drive signal is derived by stepping through the sine reference generator 54, applying each entry to the digital to analog converter (D/A) 58, and amplifying this signal to approximately 10 volts rms amplitude.

Each time an output sample is issued from the table, an input sample is collected from the analog to digital converter (A/D) 66. This sample is then multiplied by the sine reference table value and added to a sine side summation buffer. A similar multiplication occurs for the cosine reference generator 56, with the result summed into the cosine side summation buffer. These summations are signed.

$$\text{sin\_sum}(n) = \text{sin\_sum}(n-1) + \text{sin\_ref}(n)*\text{AD\_sample} \quad [1]$$

$$\text{cosin\_sum}(n) = \text{cosin\_sum}(n-1) + \text{cosin\_ref}(n)*\text{AD\_sample} \quad [2]$$

where n is the number of samples used. Sin_sum(n) and cosin_sum(n) are simply written as sin_sum and cos_sum.

To get a simple rms representation, the sine summation is squared, as is the cosine summation, the squares added, and the square root of that taken. This is representative of the rms amplitude of the measured voltage.

$$\text{rms\_rep} = \text{sin\_sum}*\text{sin\_sum} + \text{cos\_sum}*\text{cos\_sum} \quad [3]$$

Note, however, that in reality, as the following calculation deals with the ratio of two values, only rms representative values and not the actual voltage values are used for calculation and thus the square root operation is not needed.

These sampled data manipulations form a bandpass filter, with a center frequency at exactly the drive frequency. A number of samples are taken, the larger quantities n (see equation [1] above) providing a narrower passband with a larger passband/stopband amplitude ratio.

The voltage measurements for the drive voltage and longitudinal voltages are simply computed using the sine and cosine summations gathered during their drive stages, using the calculations below.

for samples taken during drive voltage measurement:

$$\text{drive\_rep} = \text{sin sum}*\text{sin\_sum} + \text{cos\_sum}*\text{cos\_sum} \quad [4]$$

for samples taken during tip-gnd voltage measurement:

$$\text{tg\_rep} = \text{sin\_sum}*\text{sin\_sum} + \text{cos\_sum}*\text{cos\_sum} \quad [5]$$

$$\text{rg\_rep} = \text{sin\_sum}*\text{sin\_sum} + \text{cos\_sum}*\text{cos\_sum} \quad [6]$$

The metallic voltage calculation uses data from both the normal and reversed drive stages. The two sine summations are subtracted and divided by two, as are the two cosine summations. These averaged values are then squared, added, and square rooted to obtain the metallic RMS representation.

$$\text{met\_sin\_sum} = (\text{norm\_sin sum} - \text{rev\_sin\_sum})/2 \quad [7]$$

$$\text{met\_cos\_sum} = (\text{norm\_cos\_sum} - \text{rev\_cos\_sum})/2 \quad [8]$$

$$\text{metallic\_rep} = \text{met\_sin\_sum}*\text{met\_sin\_sum} + \text{met\_cos\_sum}*\text{met\_cos\_sum} \quad [9]$$

The longitudinal balance is then calculated using the drive representation divided by the metallic RMS representation. As mentioned above these are representation values and not real voltage values. The ratio, however, correct for the value of the longitudinal balance. It should also be noted that all calculations are done in complex numbers.

$$\text{balance} = 20 * \log_{10}(\text{drive rep}/\text{metallic rep}) \quad [10]$$

The simple rms values of the normal and reverse drive stages could be calculated and averaged to provide the metallic representation, but the upper limit to the measurement is significantly lower than that obtainable by using sine and cosine sum averaging.

In this embodiment, the source resistors are 500 ohms (not 368 ohms as defined in the IEEE standard) and therefore the above balance value must be adjusted to make reading compatible with the standard. This step, of course, is unnecessary if the resistors are 368 ohms.

The new technique allows use of low cost hardware, already available within a testhead which is on the market. This testhead is general purpose in nature, and does not contain any special hardware specifically designed for longitudinal balance measurements. The new technique does not require precision components, allowing for low cost implementation, nor manual adjustment in the stimulus source or measurement circuits, realizing an unattended operation by a simple remote request.

Phase and frequency correlation of measured loop voltages with stimulus voltage allows superior rejection of foreign signals, and allows normal and reversed polarity measurements to be combined.

A testhead according to the present invention connects metallically to subscriber loops and may be physically located near the Main Distribution Frame of the telecommunications switching equipment which serves the loops. The testhead can be part of a distributed test system, wherein test personnel are in a central location, and perform remote testing of the loops. The system provides high quality testing without the need for human intervention at the testhead location; the centralized test craftsperson and operational system control all aspects of loop access and testing.

I claim:

1. A method of measuring longitudinal balance of a pair of relatively long wires having tip and ring terminals, comprising steps of:
    digitally generating a sinusoidal stimulus signal of a predetermined frequency by processing digital reference signals;
    applying the sinusoidal stimulus signal to the tip and ring terminals in one connection profile;
    applying the sinusoidal stimulus signal to the tip and ring terminals in a reverse connection profile;
    measuring voltages at the tip, ring and ground terminals with respect to each other in each connection profile;
    digitizing the measured voltages to generate digital measured signals which indicate the magnitude and phase of the measured voltage; and
    processing the digital measured signals and digital reference signals to derive the longitudinal balance of the pair of long wires.

2. The method according to claim 1, wherein the step of generating a sinusoidal stimulus signal comprises steps of:
    deriving the digital reference signals from a table and converting the same to a sinusoidal stimulus signal by a D/A converter.

3. The method according to claim 1, wherein the step of applying the sinusoidal stimulus signal comprises steps of:
    operating a relay matrix which includes multiple relay switches to configure desired connection profiles for applying the stimulus signal to and for measuring voltages at any desired one of the terminals.

4. The method according to claim 2, wherein the step of processing the digital measured and reference signals comprises steps of:
    obtaining sine and cosine digital reference signals from the table, multiplying the sine and cosine digital reference signals with the digital measured signals, and summing respective multiplied signals to generate running sine sum signals and cosine sum signals.

5. The method according to claim 4, wherein the step of measuring the voltages at the tip, ring and ground terminals with respect to each other in each of the connection profiles to obtain respective digital measured signals, and the step of processing the digital measured and reference signals comprises steps of obtaining sine and cosine digital reference signals from the table, multiplying the sine and cosine digital reference signals with the respective digital measured signals, and summing respective multiplied signals to generate respective running sine sum signals and cosine sum signals.

6. The method according to claim 5, wherein the step of processing the digital measured signals and digital reference signals further comprises steps of obtaining from the respective running sine sum and cosine sum signals drive representative values and metallic representative values, and calculating the longitudinal balance therefrom.

7. The method according to claim 5, wherein the step of applying the sinusoidal stimulus signal comprises a step of operating the relay matrix in at least three different connection profiles so that the step of measuring voltages is conducted simultaneously at the tip and ring terminals in one profile, simultaneously at the tip and ring terminals in reverse profile, and individually at the tip or ring terminal in the third profile.

8. An apparatus for measuring the longitudinal balance of a pair of relatively long wires having tip and ring terminals comprising:
    a digital reference signal generator having a reference table for generating digital reference signals;
    a converter for converting said digital reference signals to a sinusoidal stimulus signal of a predetermined frequency to be applied to the tip and ring terminals;
    measuring means for measuring voltages at the tip, ring and ground terminals with respect to each other;
    a relay matrix having a plurality of switching relays for selectively configuring a desired connection profile among the terminals, the converter and measuring means so that the sinusoidal stimulus signal is applied to the tip and ring terminals in either one connection profile or a reverse connection profile, and the voltages can be measured at any selected one of the terminals;
    digitizing means for digitizing the measured voltages to generate digital measured signals which indicate the magnitude and phase of the measured voltages; and
    digital signal processing means for processing the digital measured signals and digital reference signals to derive the longitudinal balance of the pair of long wires.

9. The apparatus according to claim 8, wherein the relay matrix connects the tip, ring and ground terminals with the measuring means in one connection profile in which the voltages are measured simultaneously at the tip and ring terminals in one configuration, and in another profile in which the voltages are measured simultaneously at the tip and ring terminals in reverse configuration.

10. The apparatus according to claim 8, wherein the relay matrix connects the tip, ring and ground terminals with the measuring means in yet another connection profile in which the voltages are measured individually at the tip and ring terminals.

11. The apparatus according to claim 8, wherein the relay matrix connects the tip, ring and ground terminals with the measuring means to measure the voltages at the tip and ring terminals simultaneously.

12. The apparatus according to claim 8 wherein the measuring means comprises voltage dividers and a differential amplifier.

13. The apparatus according to claim 8, wherein the digital reference signal generator comprises a sine reference table and cosine reference table, the sine reference table being used for generating the sinusoidal stimulus signal and both tables for generating sine and cosine signals as digital reference signals.

14. The apparatus according to claim 13, wherein the digital signal processing means comprises multipliers and summing means for multiplying and summing the digital measured signals and digital reference signals.

15. The apparatus according to claim 13, wherein the frequency of the sinusoidal stimulus signal is chosen from a plurality of available frequencies.

* * * * *